US012183181B2

(12) United States Patent
Rossey et al.

(10) Patent No.: US 12,183,181 B2
(45) Date of Patent: Dec. 31, 2024

(54) APPARATUS AND RELATED METHOD FOR PROXIMITY AWARENESS

(71) Applicant: LOPOS BV, Ghent (BE)

(72) Inventors: Jen Rossey, Lochristi (BE); Bart Jooris, Oudenburg (BE)

(73) Assignee: LOPOS BV, Ghent (BE)

( * ) Notice: Subject to any disclaimer, the term of this patent is extended or adjusted under 35 U.S.C. 154(b) by 0 days.

(21) Appl. No.: 18/013,352

(22) PCT Filed: Jun. 30, 2021

(86) PCT No.: PCT/EP2021/067984

§ 371 (c)(1),
(2) Date: Dec. 28, 2022

(87) PCT Pub. No.: WO2022/003018

PCT Pub. Date: Jan. 6, 2022

(65) Prior Publication Data

US 2023/0252879 A1 Aug. 10, 2023

(30) Foreign Application Priority Data

Jun. 30, 2020 (EP) .................................... 20183275

(51) Int. Cl.
*G08B 21/22* (2006.01)

(52) U.S. Cl.
CPC .................................. *G08B 21/22* (2013.01)

(58) Field of Classification Search
USPC .... 340/686.6, 572.1–572.9, 539.1, 515, 517, 340/539.23, 571, 582
See application file for complete search history.

(56) References Cited

U.S. PATENT DOCUMENTS

| | | | |
|---|---|---|---|
| 7,868,760 B2 | 1/2011 | Smith et al. | |
| 2008/0084317 A1 | 4/2008 | Gakhar et al. | |
| 2011/0195701 A1 | 8/2011 | Cook et al. | |
| 2012/0323685 A1* | 12/2012 | Ullah .................... | H04W 48/16 705/14.58 |

(Continued)

FOREIGN PATENT DOCUMENTS

WO 2009138955 A2 11/2009

OTHER PUBLICATIONS

Search Report from corresponding European Application No. 20183275.5, Dec. 10, 2020.

(Continued)

*Primary Examiner* — Daniel Previl
(74) *Attorney, Agent, or Firm* — Workman Nydegger

(57) ABSTRACT

An apparatus for enabling proximity awareness, including: a proximity assessing unit having an Ultra-Wide Band interface to determine a distance between said apparatus and a neighbouring device and/or an orientation of said apparatus with respect to a neighbouring device; a first determining unit determining one or more apparatus parameters; a second determining unit determining one or more neighbouring device parameters; a stimulus generating unit generating a stimulus; and a selecting unit selecting a type and/or an intensity of said stimulus in function of a combination of said distance and/or said orientation, said one or more apparatus parameters and said one or more neighbouring device parameters.

12 Claims, 3 Drawing Sheets

(56) References Cited

U.S. PATENT DOCUMENTS

| | | | | |
|---|---|---|---|---|
| 2016/0012465 | A1* | 1/2016 | Sharp | G06Q 20/321 705/14.17 |
| 2017/0124362 | A1* | 5/2017 | Sheng | G06K 7/10396 |
| 2020/0154189 | A1* | 5/2020 | Tiscareno | H04R 1/22 |
| 2021/0169417 | A1* | 6/2021 | Burton | A61B 5/4857 |
| 2021/0192852 | A1* | 6/2021 | Holmes | G06F 3/048 |

OTHER PUBLICATIONS

International Search Report from PCT Application No. PCT/EP2021/067984, Oct. 13, 2021.

* cited by examiner

APPARATUS AND RELATED METHOD FOR PROXIMITY AWARENESS

TECHNICAL FIELD

The present invention generally relates, amongst others, to the field of proximity awareness and proximity alert systems. More particularly, it relates to an apparatus and a computer-implemented method for enabling wireless proximity awareness and for ensuring sufficient physical separation between two or more persons and/or objects.

BACKGROUND

Devices to ensure physical separation between persons and/or objects are known in the art and may be used for a large number of applications. Proximity awareness generally relates to technology which automatically begins communicating when in close physical proximity.

Construction sites, industrial factories, working areas or other job sites are populated with a wide range of hazardous equipment and obstacles. For example, when using a lifting device, such as for example, a crane, it is often very difficult or impossible for an operator to see the area around and below a load that is being lifted, moved, or positioned by the lifting device. In other words, it is difficult and sometimes dangerous to operate moving engines on a construction site, as the operator cannot see the position of the engine and/or of the load and/or of other operators or machines in the surroundings, and the hazards that might hit or be hit by the load. Additionally, a construction site, a worksite, a job site, or work area often has more than one device in operation at any given time. As devices are often in movement and require immense concentration to operate, it can be difficult for an operator to constantly determine if there is adequate clearance to prevent collision of some portion of the device or load with a portion of another device or another device's load or with another operator. A further potential use of such devices in the workplace is for example when working with potentially dangerous substances, such as for example bio-chemical agents, bio-chemicals, contagious disease livestock, or even with life threatening substances such as a radioactive substances. Operators coming in proximity with such agents can be alerted of their presence. Devices warning the operators ensure physical separation then become relevant when faced with complicated or diminished situational awareness.

Devices for proximity awareness and proximity alert systems also become relevant for example when it becomes necessary to abide by social distancing rules. For example, in the context of a worldwide pandemic or epidemic, such devices can be used to ensure physical separation between persons is respected at all times in order to minimize the risk of contagion or contamination or spreading of the infection or the virus, such as nosocomial infections, seasonal flu, tuberculosis, small pox, chicken pox, avian flu, influenza, influenza A virus subtype H1N1, influenza A virus subtype H5N1, Severe Acute Respiratory syndrome or SARs, coronavirus such as Covid-19, Ebola virus disease or EVD, etc. For example, in a hospital environment, if there is a contagious disease outbreak, it is required to identify the people exposed to the infectious agent within a certain distance, and to ensure no additional person comes in close proximity with the infected people without suitable protection. If all patients, visitors and staff in the hospital are tagged with proximity awareness and identification device and their movements and locations are tracked, it becomes possible to identify individuals who were exposed to the contagious disease or who for example have a positive test result for the contagious disease, and social distancing rules must be implemented in order to temporarily isolate these exposed individuals, thereby containing the spread of the contagious disease. More generally, devices for proximity awareness can also be used in our modern societies during an outbreak to minimize physical social interaction between individuals in for example public transport or working areas to ensure everyone's safety.

Most prior art devices generate a stimulus to alert an individual or another device aware of its surroundings that a minimum physical distance between the two entities is overstepped. However, it might be difficult to identify this stimulus in challenging environment. For example, because of ambient construction noise or other distractions, personnel walking on a construction site might not hear for example a vehicle coming from behind or might not notice their close proximity to a moving engine. Furthermore, in the context of a global pandemic, public health might be endangered by the lack of coupling between the stimulus and information related to the context. For example, when it comes to SARs and Covid-19, direct or indirect measurements such as body temperature via thermal cameras can be used to identify potential SARs or Covid-19 carriers. However, not all SARs or Covid-19 patients have these symptoms at the start of infection. Therefore, many potential infected carriers can still skip through, thereby spreading the infection further.

SUMMARY

It is thus an object of embodiments of the present invention to propose a computer-implemented method and an apparatus which do not show the inherent shortcomings of the prior art. More specifically, it is an object of embodiments of the present invention to propose a method and an apparatus to improve proximity awareness of an individual and/or of an object.

The scope of protection sought for various embodiments of the invention is set out by the independent claims.

The embodiments and features described in this specification that do not fall within the scope of the independent claims, if any, are to be interpreted as examples useful for understanding various embodiments of the invention.

There is a need for improving proximity awareness of an individual and/or of an object.

Amongst others, it is an object of embodiments of the invention to improve proximity awareness and to ensure sufficient physical separation between two or more persons and/or objects in for example challenging environments such as working or construction environments or chemically or biologically hazardous environments.

This object is achieved, according to a first example aspect of the present disclosure, by an apparatus for enabling proximity awareness, wherein the apparatus comprises:

- a proximity assessing unit comprising an Ultra-Wide B and interface, wherein the proximity assessing unit is configured to determine a distance between the apparatus and a neighbouring device and/or an orientation of the apparatus with respect to a neighbouring device;
- a first determining unit configured to determine one or more apparatus parameters comprising at least one of:
  - a noise level in the vicinity of the apparatus;
  - an activity level of the apparatus;
  - an identifier of the apparatus;
  - a user group associated with the apparatus;

presence of one or more certificates on the apparatus;

a second determining unit configured to determine one or more neighbouring device parameters comprising at least one of:

an activity level of the neighbouring device;

an identifier of the neighbouring device;

a user group associated with the neighbouring device;

a type of the neighbouring device;

presence of one or more neighbouring certificates on the neighbouring device;

a stimulus generating unit configured to generate a stimulus; and a selecting unit configured to select a type and/or an intensity of the stimulus in function of a combination of the distance and/or the orientation, the one or more apparatus parameters and the one or more neighbouring device parameters.

This disclosure relates to an apparatus which ensures enough physical separation between two or more persons or objects is observed and more particularly to an apparatus that causes an indication when for example a minimum pre-determined distance has been overstepped between two or more persons or objects. The spread of infectious diseases, such as for example Covid-19, usually causes the death of thousands of people and demonstrates that a worldwide pandemic costs trillions of euros and results in a dramatic drop in world gross domestic product due to quarantine and confinement measures taken as an intent to slow the spread of the infection or virus down. Even if working vaccines become available, their supplies are usually limited and cannot be expected to stop such a virus or infection for several months. Economic losses can be minimized if the infection can be contained through proactive screening and compliance with physical separation between individuals that allows for effective anti-viral administration and narrowly targeted quarantines. The apparatus according to a first example aspect of the present disclosure ensures sufficient physical separation is guaranteed between two or more people or objects, thereby minimizing physical contact or proximity between people and thereby hindering the spread of the virus or infection.

The apparatus according to a first example aspect of the present disclosure generates one or more stimuli which can be used for ensuring social distancing, allowing or refusing admittance or passage in a monitored space, allowing geofencing, preventing a potential collision between the apparatus and one or more neighbouring devices, and/or defining safety zones in the surroundings of the apparatus. The purpose of the apparatus according to a first example aspect of the present disclosure is to track movement of neighbouring people or objects in proximity with the apparatus and to efficiently identify contexts which require the generation of a stimulus to alert a corresponding user of the apparatus. This way, it becomes very easy for the user related to the apparatus to for example respect a physical distance at all times with neighbouring devices. Additionally, the type and/or the intensity of the stimulus generated by the apparatus are selected depending on parameters of the apparatus of the neighbouring devices. This way, the apparatus can dynamically modify the nature of the stimulus and/or an intensity of the stimulus in function of the context faced in real-time by the apparatus, wherein the context is identified by the apparatus from apparatus parameters and neighbouring device parameters. For example, when an ambient noise in the surroundings of the apparatus exceeds a predetermined threshold which makes it hard for a user of the apparatus to hear an audible stimulus, the apparatus may for example select to generate a visual stimulus instead of an audible stimulus and/or the apparatus may for example increase the audible intensity of the audible stimulus. This way, it becomes easier to identify the stimulus generated by the apparatus according to a first example aspect of the present disclosure, which increases safety and improves the relevance and the compatibility of such an apparatus with a larger number of applications. Additionally, the apparatus may for example adapt the intensity of the generated stimulus in function of a context faced in real-time by the apparatus. For example, when the apparatus generates an audible stimulus indicative for a physical distance between the apparatus and at least one neighbouring device, the apparatus can adapt the intensity of the audible stimulus, for example by increasing a volume of the audible stimulus and/or when the audible stimulus is a beep signal by increasing a speed and/or a volume of the beeping signal, in function of the physical distance between the apparatus and at least one neighbouring device. For example, when the physical distance between the apparatus and at least one neighbouring device is larger than a predetermined threshold, then the apparatus generates for example an audible beeping stimulus, and when the physical distance between the apparatus and at least one neighbouring device becomes smaller than the predetermined threshold, the apparatus can accelerate and/or increase the volume of the audible beeping stimulus, thereby alerting a user of the apparatus that the physical distance between the apparatus and at least one neighbouring device is becoming smaller.

With the apparatus according to a first example aspect of the present disclosure, the selection of the nature and/or of the intensity of the stimulus generated by the apparatus depends on a combination of a distance and/or orientation, of one or more device parameters and one or more neighbouring device parameters. For example, in the context of the present disclosure, device parameters can comprise a noise level in the vicinity of the apparatus. A noise level corresponds to a volume of ambient noise and other detected sounds in the close surroundings of the apparatus. This noise level may be detected by the apparatus according to a first example aspect of the present disclosure. Alternatively, this noise level may be obtained by the apparatus according to a first example aspect of the present disclosure from for example an external device such as for example a microphone. For example, in the context of the present disclosure, device parameters can comprise an activity level of the apparatus. An activity level corresponds to one or more tasks performed by a user of the apparatus and the level corresponds to an intensity of the activity of the task. For example, if a user wearing or holding the apparatus is busy performing one or more tasks sequentially or simultaneously, his attention will be focused on these tasks and less focused on the identification of a stimulus generated by the apparatus. The apparatus must then generate a more intense stimulus and/or a different type of stimulus such as for example a vibrational stimulus to trigger the attention of the user of the apparatus. On the other hand, when a level of activity of the apparatus is low, in other words, when the apparatus is idle or when a corresponding user wearing or holding the apparatus does not perform any task, the apparatus can generate an audible stimulus and/or adapt the intensity of the stimulus to a softer level which will trigger the attention of the user. The apparatus according to a first example aspect of the present disclosure can therefore adapt the type and/or the intensity of the stimulus in real-time in function of this activity level. For example, in the context of the present disclosure, device parameters can comprise an identifier of the apparatus. An identifier for example comprises a unique identifier tag associated with the apparatus and which allows recognizing the apparatus from other apparatuses. The unique identifier tag for example comprises a number and/or a name and/or an identification tag and/or a value, etc. which can uniquely identify the corresponding apparatus. For example, in the context of the present disclosure, device parameters can comprise a user group associated with the apparatus. This way, it becomes possible to associate the apparatuses with predetermined identifiers with particular permissions or particular features. For example, several apparatuses associated with the members of the same family or of persons living under the same roof may be allowed to come closer in physical contact with each other than apparatus associated with different persons. For example, neighbouring devices associated with personnel adequately trained and suitably protected may come in closer physical contact with a risk patient in a hospital than other personnel or visitors. The type and/or the intensity of the stimulus generated by the apparatus associated with the risk patient will then be different when triggered by neighbouring devices associated with personnel adequately trained and suitably protected then when triggered by other personnel or visitors. The apparatus according to a first example aspect of the present disclosure can therefore adapt the type and/or the intensity of the stimulus in real-time in function of the user groups. For example, apparatus corresponding to certain groups may be refused entrance to building or rooms with sensitive or dangerous items. For example, apparatus worn or held by a group of personnel having completed appropriate security training may enter a server room wherein sensitive or private data is stored, while other groups will be denied entrance, thereby increasing security and preventing data and privacy breaches. For example, in the context of the present disclosure, device parameters can comprise presence of one or more certificates on the apparatus. According to the present disclosure, a certificate could be a certificate of training indicating for example if a person associated with the apparatus is allowed to for example operate heavy machinery, operate an automated guided vehicle, is allowed entrance in a building, etc. Achieving certificates often requires following prior training sessions, such as for example a certification program, and successful training provides information indicative that the person enjoys special permissions associated with the certificate. As such, in contrast to user groups, a certificate often applies to a specific person. Similarly, for example, in the context of the present disclosure, neighbouring device parameters can comprise an activity level of the neighbouring devices. An activity level corresponds to one or more tasks performed by a user of the neighbouring devices and the level corresponds to an intensity of the activity of the task. For example, if the neighbouring devices are moving towards the apparatus, the apparatus should generate a stimulus to alert for incoming neighbouring devices and prevent collision between the neighbouring devices and the apparatus. The apparatus must then generate a more intense stimulus and/or a different type of stimulus such as for example a vibrational stimulus to trigger the attention of the user of the apparatus. On the other hand, when a level of activity of the neighbouring devices is low, in other words, when the neighbouring devices are idle or when a corresponding user wearing or holding the neighbouring devices does not perform any task, the apparatus can generate an audible stimulus and/or adapt the intensity of the stimulus to a softer level which will trigger the attention of the user, as an indication of a less urgent incoming threat. The apparatus according to a first example aspect of the present disclosure can therefore adapt the type and/or the intensity of the stimulus in real-time in function of the activity levels of the neighbouring devices. For example, in the context of the present disclosure, neighbouring device parameters can comprise an identifier of the neighbouring devices. An identifier for example comprises a unique identifier tag associated with the apparatus and which allows recognizing the neighbouring devices from other neighbouring devices and from the apparatus. The unique identifier tag for example comprises a number and/or a name and/or an identification tag and/or a value, etc. which can uniquely identify the corresponding neighbouring device. For example, in the context of the present disclosure, neighbouring device parameters can comprise a user group associated with neighbouring devices. This way, it becomes possible to associate neighbouring devices with predetermined identifiers with particular permissions or particular features. For example, several neighbouring devices associated with the members of the same family or of persons living under the same roof may be allowed to come closer in physical contact with each other than neighbouring devices associated with different persons. For example, neighbouring devices associated with personnel adequately trained and suitably protected may come in closer physical contact with a risk patient in a hospital than other personnel or visitors. The type and/or the intensity of the stimulus generated by the apparatus associated with the risk patient will then be different when triggered by neighbouring devices associated with personnel adequately trained and suitably protected then when triggered by other personnel or visitors. The apparatus according to a first example aspect of the present disclosure can therefore adapt the type and/or the intensity of the stimulus in real-time in function of the user groups. For example, neighbouring devices corresponding to certain groups may be refused entrance to building or rooms with sensitive or dangerous items. For example, neighbouring devices worn or held by a group of personnel having completed appropriate security training may enter a server room wherein sensitive or private data is stored, while other groups will be denied entrance, thereby increasing security and preventing data and privacy breaches. For example, in the context of the present disclosure, neighbouring device parameters can comprise presence of one or more certificates on the neighbouring devices. According to the present disclosure, a certificate could be a certificate of training indicating for example if a person associated with the neighbouring devices is allowed to for example operate heavy machinery, operate an automated guided vehicle, is allowed entrance in a building, etc. Achieving certificates often requires following prior training sessions, such as for example a certification program, and successful training provides information indicative that the person enjoys special permissions associated with the certificate. As such, in contrast to user groups, a certificate often applies to a specific person.

This way, unwanted, unallowed and/or potentially dangerous or hazardous situations for the apparatus may be avoided by improving proximity awareness of the apparatus. In the context of a pandemic for example, this allows implementing efficient and accurate testing and quarantine procedures and mitigating the spread of infectious diseases and to reduce unnecessary avoidance behaviors, thereby saving lives and billions of euros. The apparatus can identify active cases in an outbreak through pro-active sampling in high risk locations, such as schools or crowded commercial areas, and can allow for sampling and quarantine of surrounding cases to help eradicate the outbreak. The system can also suggest an appropriate response for deployment of scarce resources and predict the impact of such mitigation both in terms of reduction of mortality and morbidity and economic impact. The apparatus according to the present disclosure also allows traceability of any neighbouring device who has come in physical contact with an individual corresponding to the apparatus, therefore allowing to alert anybody who was in the vicinity of a potentially infected individual, even if this individual was not demonstrating any symptoms. More generally, devices for proximity awareness can be used in our modern societies during an outbreak to minimize physical social interaction between individuals in for example public transport or working areas by generating stimuli reminding the individuals of a minimum physical distance to ensure everyone's safety.

The apparatus according to a first example aspect of the present disclosure is for example a wearable apparatus which can be worn by an individual or an animal. For example, the apparatus according to a first example aspect of the present disclosure is a small, handy, portable device which can be worn by a person, for example attached securely or in a removable manner on clothes, or for example worn as a bracelet on the wrist or the ankle. Alternatively, the apparatus according to a first example aspect of the present disclosure is a wearable tag which can be worn by an individual or an animal or which can be example attached securely or in a removable manner on an object such as for example an engine, a moving engine, etc., without requiring specifically designed infrastructure for its attachment. The apparatus according to a first example aspect of the present disclosure may be used both indoors and outdoors. The apparatus according to a first example aspect of the present disclosure is configured to communicate with neighbouring devices which are similar to the apparatus according to a first example aspect of the present disclosure. Alternatively, the apparatus according to a first example aspect of the present disclosure is configured to communicate with any other device comprising suitable communication means to interact with the apparatus according to a first example aspect of the invention. The apparatus according to a first example aspect of the present disclosure is self-sufficient in the sense that it is not necessary to download for example a mobile application on for example a mobile communication device to be able to interact with the apparatus. The apparatus comprises one proximity assessing unit. A proximity assessing unit according to the first example aspect of the present disclosure for example comprises an infra-red proximity sensor and/or a Bluetooth interface and/or an Ultra-Wide Band technology or a UWB interface for accurate estimations of the distance and/or the orientation of the apparatus with respect to neighbouring devices. UWB is indeed much more accurate and faster than Bluetooth for determination of distances between the apparatus and neighbouring devices. With Bluetooth, the margin of error in the determination of the distance is for example in the range of 2 to 5 meters, while with UWB it is for example a maximum of 15 cm. This means the apparatus according to the present disclosure can accurately identify or determine the difference between 1.50 m and 1.65 m, whereas Bluetooth only recognizes the difference between 1.5 m and 3.5 m at best. If for example the apparatus must generate a stimulus to ensure a minimum physical separation of 1.65 m between the apparatus and a neighbouring device, with UWB, it is certain that presence of a neighbouring device within 1.5 m of the apparatus will be signaled to keep more distance by the stimulus which can for example be sound and vibration, an LED light, etc. Ultra-wideband is a technology for transmitting information across a wide bandwidth such as for example larger than 500 MHz. This allows for the transmission of a large amount of signal energy without interfering with conventional narrowband and carrier wave transmission in the same frequency band. Alternatively, UWB is understood in the context of the present disclosure as an antenna transmission for which emitted signal bandwidth exceeds the lesser of 500 MHz or 20% of the arithmetic center frequency. Thus, pulse-based systems—where each transmitted pulse occupies the UWB bandwidth or an aggregate of at least 500 MHz of narrowband carrier; for example, orthogonal frequency-division multiplexing—can access the UWB spectrum under the rules. In other words, UWB transmissions transmit information by generating radio energy at specific time intervals and occupying a large bandwidth, thus enabling pulse-position or time modulation. The information can also be modulated on UWB signals by encoding for example the polarity of the pulse and/or its amplitude and/or by using orthogonal pulses. For example, UWB pulses can be sent sporadically at relatively low pulse rates to support time or position modulation but can also alternatively be sent at rates up to the inverse of the UWB pulse bandwidth. An UWB radio system can for example be used to determine the "time of flight" of the transmission at various frequencies. This helps overcome multipath propagation, since some of the frequencies have a line-of-sight trajectory, while other indirect paths have longer delays. This allows to measure distances with high resolution and accuracy. Alternatively, the apparatus comprises several proximity assessing units. The proximal sensing range of the proximity assessing unit is defined as an area comprised between an outer sensing range boundary and the proximity assessing unit. The outer sensing range boundary corresponds to positions from which presence is detectable by the proximity assessing unit and for which the distance between the proximity assessing unit and the positions is the furthest allowable sensing distance for the proximity assessing unit. The outer sensing range boundary is for example defining a section of a circle or a circle with a radius corresponding to a furthest allowable sensing distance to the proximity assessing unit. The proximity sensing range extends for example 10 meters, 2 meters, or 1 meter, or 50 centimetres, or 40 centimetres, or 30 centimetres from the proximity assessing unit, i.e. the distance from which the apparatus will generate stimuli. The furthest allowable sensing distance may be the furthest sensing distance of the proximity assessing unit. Alternatively, the furthest allowable sensing distance is programmed in the proximity assessing unit. In the context of the present disclosure, a neighbouring device is for example identical to the apparatus. Alternatively, a neighbouring device comprises any suitable communication means which are configured to allow the neighbouring device to communicate with the apparatus according to a first example aspect of the invention.

According to example embodiments, the apparatus further comprises a third determining unit configured to:

- determine a duration since a previous determination of a distance and/or an orientation between the apparatus and the neighbouring device; and
- determine a change in distance and/or in orientation between the previous determination and the determination by the proximity assessing unit;

and wherein the selecting unit is further configured to adapt the type and/or the intensity of the stimulus based on a combination of the change in distance and/or in orientation, the one or more apparatus parameters and the one or more neighbouring device parameters.

This way, the apparatus can update the nature and/or the intensity of the stimulus based on an updated determination of a distance and/or an orientation of the apparatus with respect to neighbouring devices. For example, the third determining unit can determine a duration since the previous determination of the distance and/or the orientation between the apparatus and the neighbouring device, and when this duration is larger than a predetermined time threshold and when an activity level of one or more of the neighbouring device indicates a movement, the third determining unit then determines a change in distance and/or in orientation between the previous determination and the updated determination by the proximity assessing unit. This change provides information for example on the relative movement of the apparatus and the neighbouring device: if the change is indicative for a smaller physical distance between the apparatus and the neighbouring device, this is an indication that the apparatus and the neighbouring device are coming close to each other. Additionally, this change is indicative for a speed of the displacement of the neighbouring device with respect to the apparatus. The apparatus can then adapt the type and/or the intensity of the stimulus based on a combination of the change in distance and/or in orientation, the one or more apparatus parameters and the one or more neighbouring device parameters to alert of a potential collision or potentially unallowed physical contact. The apparatus can for example adapt the intensity of the stimulus as a function of the distance, thereby generating an more intense stimulus for a smaller distance between the apparatus and the neighbouring device and/or for a high speed of movement towards each other, and generating a less intense stimulus for a larger distance between the apparatus and the neighbouring device or a smaller speed of movement. Alternatively, the third determining unit can determine a duration since the previous determination of the distance and/or the orientation between the apparatus and the neighbouring device, and when this duration is very short, for example less than a minute or a few seconds, and when an activity level of one or more of the neighbouring device indicates idleness, the third determining unit does not determine a change in distance and/or in orientation between the previous determination and the determination by the proximity assessing unit, thereby saving energy and increasing the lifetime of the apparatus.

According to example embodiments, the proximity assessing unit is configured to determine the distance between the apparatus and the neighbouring devices and/or the orientation of the apparatus with respect to the neighbouring devices with a frequency in function of a combination of the type and/or the intensity of the stimulus and/or in function of a combination of the distance and/or the orientation, the one or more device parameters and the one or more neighbouring device parameters.

This way, the frequency with which the proximity assessing unit determines the distance between the apparatus and a neighbouring device is variable. This frequency can depend on or be based on a combination of the type and/or the intensity of the stimulus and/or can depend on or be based on a combination of the distance, one or more device parameters and one or more neighbouring device parameters.

According to example embodiments, the type of the stimulus corresponds to one or more of the following:

sound;
light;
vibration;
signaling;
activating a stimulus on another device.

According to the present disclosure, a stimulus is a continuous visual signal. Alternatively, a stimulus is a flashing visual signal, or a periodically blinking visual signal, etc. According to the present disclosure, a stimulus is a continuous audible signal. Alternatively, a stimulus is a beeping audible signal, or a periodically beeping audible signal, etc. According to the present disclosure, a stimulus is a continuous vibrational signal. Alternatively, a stimulus is an intermitted vibrational signal, or a periodic vibrational signal, etc. According to the present disclosure, a stimulus corresponds to the activation of a stimulus from another device such as for example a stimulus of one or more of the neighbouring devices. For example, a stimulus can correspond to the generation of an audible stimulus by a neighbouring device, such as a honk, when the neighbouring device is moving at high speed towards the apparatus, thereby trying to warn of a potential collision between the neighbouring device and the apparatus. According to the present disclosure, a stimulus is signaling. For example, the apparatus could broadcast or transmit a data signal or a data message to one or more neighbouring devices such as for example a smartphone, or a tablet, or a remote computer or server. Preferably, the signaling can be sent wirelessly. Alternatively, the signaling can be sent through other suitable communication protocols.

In the context of the present disclosure, wireless proximity presence notification refers to wireless alerts sent to the wireless devices of other individuals, friends or contacts that are within proximity, relative to the wireless network communication towers. A wireless device is an electronic communication device that enables two or more individuals to communicate using data. Examples of wireless devices include pagers, cellular phones, cellular smart-phones, wireless handheld organizers, and wirelessly enabled notebook computers.

According to example embodiments, the intensity of the stimulus corresponds to one or more of the following:

sound level;
sound frequency;
light intensity;
wavelength;
light source selection;
vibration frequency;
vibration amplitude;
frequency of signaling;
content of signaling.

According to example embodiments, the apparatus further comprises a rule engine configured to obtain one or more predetermined rules, wherein each of the predetermined rules defines a correspondence between a type and/or an intensity of the stimulus and a predetermined combination of the distance and/or the orientation, the one or more apparatus parameters and the one or more neighbouring device parameters; and wherein the selecting unit is further configured to select the type and/or the intensity of the stimulus in function of one or more of the predetermined rules.

This way, the predetermined rules are used by the apparatus to select the nature and/or the intensity of the stimulus. For example, user groups can be predetermined. For example, in a company, personnel related to a given department can belong to the same user group. Alternatively, for example, all inhabitants of the same roof can belong to the same user group. For example, a minimum distance can be predetermined for a rotating crane such that a radius can be defined at 360 degrees around the crane in order to constantly determine if there is adequate clearance to prevent collision of the crane with another engine or an operator.

According to example embodiments, the predetermined rules comprise predetermined thresholds for the apparatus parameters and/or for the neighbouring device parameters.

According to example embodiments, the proximity assessing unit is configured to assess the distance and/or the orientation between the apparatus and the neighbouring device from one or more of the following:

a signal strength of a signal received by the apparatus;
a timestamp of reception of the signal by the apparatus;
phase information comprised in the signal.

This way, the third determining unit can determine the duration since a previous determination of a distance and/or an orientation between the apparatus and the neighbouring device from the timestamp of reception of a previous signal received from the neighbouring device and the timestamp of reception of a new incoming signal received from the neighbouring device.

According to example embodiments, the apparatus further comprises a saving unit configured to generate a neighbour table and further configured to store the neighbouring device parameters in the neighbour table.

This way, the neighbour table comprises information indicative for a last distance and/or orientation evaluated between the apparatus and the corresponding neighbouring device. The neighbour table comprises for example a time to live indication, which provides information indicative for how long it has been since a discovery signal was received. This way, the apparatus can for example detect if a neighbouring device is no longer in its proximity. Additionally, the neighbour table optionally stores technical information required to communicate efficiently with the neighbouring devices. For example, the neighbour table stores the radio frequency of one or more of the neighbouring devices. Optionally, the neighbour table stores the modulation format of one or more of the neighbouring devices. Additionally, the neighbour table comprises technical information required to efficiently determine a distance and/or an orientation with respect to the neighbouring devices. For example, the neighbour table comprises orthogonal code, and/or other radio parameters of the neighbouring devices.

According to example embodiments, the apparatus further comprises a discovery unit configured to broadcast a discovery signal.

The discovery signal for example is a packet that is sent by the apparatus over a communication radio. For example, the discovery signal is a discovery message. By broadcasting and/or transmitting this discovery signal, the apparatus requests neighbouring devices to provide the apparatus with neighbouring parameters. Upon reception of the discovery signal from the apparatus, each neighbouring device transmits and/or broadcasts neighbouring parameters back to the apparatus.

According to example embodiments, the saving unit is further configured to store in the neighbour table at least one or more of the following:

the duration since a previous determination of a distance between the apparatus and the neighbouring devices and/or an orientation of the apparatus with respect to the neighbouring devices;
the change in distance and/or in orientation determined between the previous determination and the determination by the proximity assessing unit;
a broadcasting duration since broadcasting a previous discovery signal.

According to example embodiments, the apparatus further comprises an accelerometer configured to determine acceleration data for the apparatus; and the first determining unit is further configured to determine the activity level of the apparatus from at least the acceleration data.

The accelerometer is configured to measure a proper acceleration of the apparatus, wherein proper acceleration is the acceleration, i.e. the rate of change of velocity of the apparatus in its own instantaneous rest frame. In other words, the accelerometer is configured to determine a rate of change of velocity of the apparatus and the first determining unit is further configured to determine the activity level of the apparatus from at least the rate of change of velocity of the apparatus. This way, the level of activity of the apparatus can be determined from data measured by the accelerometer such as for example the rate of change of velocity of the apparatus. Optionally, when the neighbouring devices comprise an accelerometer, the accelerometer of the apparatus and the accelerometers of the neighbouring devices may be coordinated with one another so that they can measure differences in proper acceleration over their separation in space. The activity level of the neighbouring devices may also be determined from acceleration data measured by accelerometers comprised in the neighbouring devices.

According to a second example aspect of the present disclosure, there is provided a computer-implemented method for enabling proximity awareness for an apparatus comprising a proximity assessing unit comprising an Ultra-Wide Band interface, wherein the method comprises the steps of:

determining with the proximity assessing unit a distance between the apparatus and a neighbouring device and/or an orientation of the apparatus and a neighbouring device;
determining one or more apparatus parameters comprising at least one of:
a noise level in the vicinity of the apparatus;
an activity level of the apparatus;
an identifier of the apparatus;
a user group associated with the apparatus;
presence of one or more certificates on the apparatus;
determining one or more neighbouring device parameters comprising at least one of:
an activity level of the neighbouring device;
an identifier of the neighbouring device;
a user group associated with the neighbouring device;
a type of the neighbouring device;
presence of one or more neighbouring certificates on the neighbouring device;
selecting a type and/or an intensity of a stimulus in function of a combination of the distance and/or the orientation, the one or more apparatus parameters and the one or more neighbouring device parameters; and
generating the stimulus of the selected type and/or intensity.

The computer-implemented method according to the present disclosure generates one or more stimuli which can be used for ensuring social distancing, allowing or refusing admittance or passage in a monitored space, allowing geofencing, preventing a potential collision between the apparatus and one or more neighbouring devices, and/or defining safety zones in the surroundings of the apparatus. The purpose of the computer-implemented method according to the present disclosure is to track movement of neighbouring people or objects in proximity with the apparatus and to efficiently identify contexts which require the generation of a stimulus to alert a corresponding user of the apparatus. This way, it becomes very easy for the user related to the apparatus to for example respect a physical distance at all times with neighbouring devices. Additionally, the type and/or the intensity of the stimulus generated by the apparatus are selected depending on parameters of the apparatus or of the neighbouring devices. This way, the computer-implemented method according to the present disclosure can dynamically modify the nature of the stimulus and/or an intensity of the stimulus in function of the context faced in real-time by the apparatus, wherein the context is identified by the apparatus from apparatus parameters and neighbouring device parameters. For example, when an ambient noise in the surroundings of the apparatus exceeds a predetermined threshold which makes it hard for a user of the apparatus to hear an audible stimulus, the computer-implemented method according to the present disclosure may for example select to generate a visual stimulus instead of an audible stimulus and/or the apparatus may for example increase the audible intensity of the audible stimulus. This way, it becomes easier to identify the stimulus generated by the apparatus, which increases safety and improves the relevance and the compatibility of such an apparatus with a larger number of applications. Additionally, the computer-implemented method according to the present disclosure may for example adapt the intensity of the generated stimulus in function of a context faced in real-time by the apparatus. For example, when the apparatus generates an audible stimulus indicative for a physical distance between the apparatus and at least one neighbouring device, the computer-implemented method according to the present disclosure can adapt the intensity of the audible stimulus, for example by increasing a volume of the audible stimulus and/or when the audible stimulus is a beep signal by increasing a speed and/or a volume of the beeping signal, in function of the physical distance between the apparatus and at least one neighbouring device. For example, when the physical distance between the apparatus and at least one neighbouring device is larger than a predetermined threshold, then the computer-implemented method according to the present disclosure generates for example an audible beeping stimulus, and when the physical distance between the apparatus and at least one neighbouring device becomes smaller than the predetermined threshold, the computer-implemented method according to the present disclosure can accelerate and/or increase the volume of the audible beeping stimulus, thereby alerting a user of the apparatus that the physical distance between the apparatus and at least one neighbouring device is becoming smaller.

According to a third example aspect of the present disclosure, there is provided a computer program product comprising computer-executable instructions for causing an apparatus comprising a proximity assessing unit comprising an Ultra-Wide Band interface to perform at least the following:

- determining with the proximity assessing unit a distance between an apparatus and a neighbouring device and/or an orientation of the apparatus and a neighbouring device;
- determining one or more apparatus parameters comprising at least one of:
  - a noise level in the vicinity of the apparatus;
  - an activity level of the apparatus;
  - an identifier of the apparatus;
  - a user group associated with the apparatus;
  - presence of one or more certificates on the apparatus;
- determining one or more neighbouring device parameters comprising at least one of:
  - an activity level of the neighbouring device;
  - an identifier of the neighbouring device;
  - a user group associated with the neighbouring device;
  - a type of the neighbouring device;
  - presence of one or more neighbouring certificates on the neighbouring device;
- selecting a type and/or an intensity of a stimulus in function of a combination of the distance and/or the orientation, the one or more apparatus parameters and the one or more neighbouring device parameters; and
- generating the stimulus of the selected type and/or intensity.

According to a fourth example aspect of the present disclosure, there is provided a computer readable storage medium comprising computer-executable instructions for performing the following steps when the program is run on a computer:

- determining with a proximity assessing unit comprising an Ultra-Wide Band interface a distance between an apparatus comprising the proximity assessing unit and a neighbouring device and/or an orientation of the apparatus and a neighbouring device;
- determining one or more apparatus parameters comprising at least one of:
  - a noise level in the vicinity of the apparatus;
  - an activity level of the apparatus;
  - an identifier of the apparatus;
  - a user group associated with the apparatus;
  - presence of one or more certificates on the apparatus;
- determining one or more neighbouring device parameters comprising at least one of:
  - an activity level of the neighbouring device;
  - an identifier of the neighbouring device;
  - a user group associated with the neighbouring device;
  - a type of the neighbouring device;
  - presence of one or more neighbouring certificates on the neighbouring device;
- selecting a type and/or an intensity of a stimulus in function of a combination of the distance and/or the orientation, the one or more apparatus parameters and the one or more neighbouring device parameters; and
- generating the stimulus of the selected type and/or intensity.

BRIEF DESCRIPTION OF THE DRAWINGS

Some example embodiments will now be described with reference to the accompanying drawings.

DETAILED DESCRIPTION OF EMBODIMENT(S)

Figure 1:
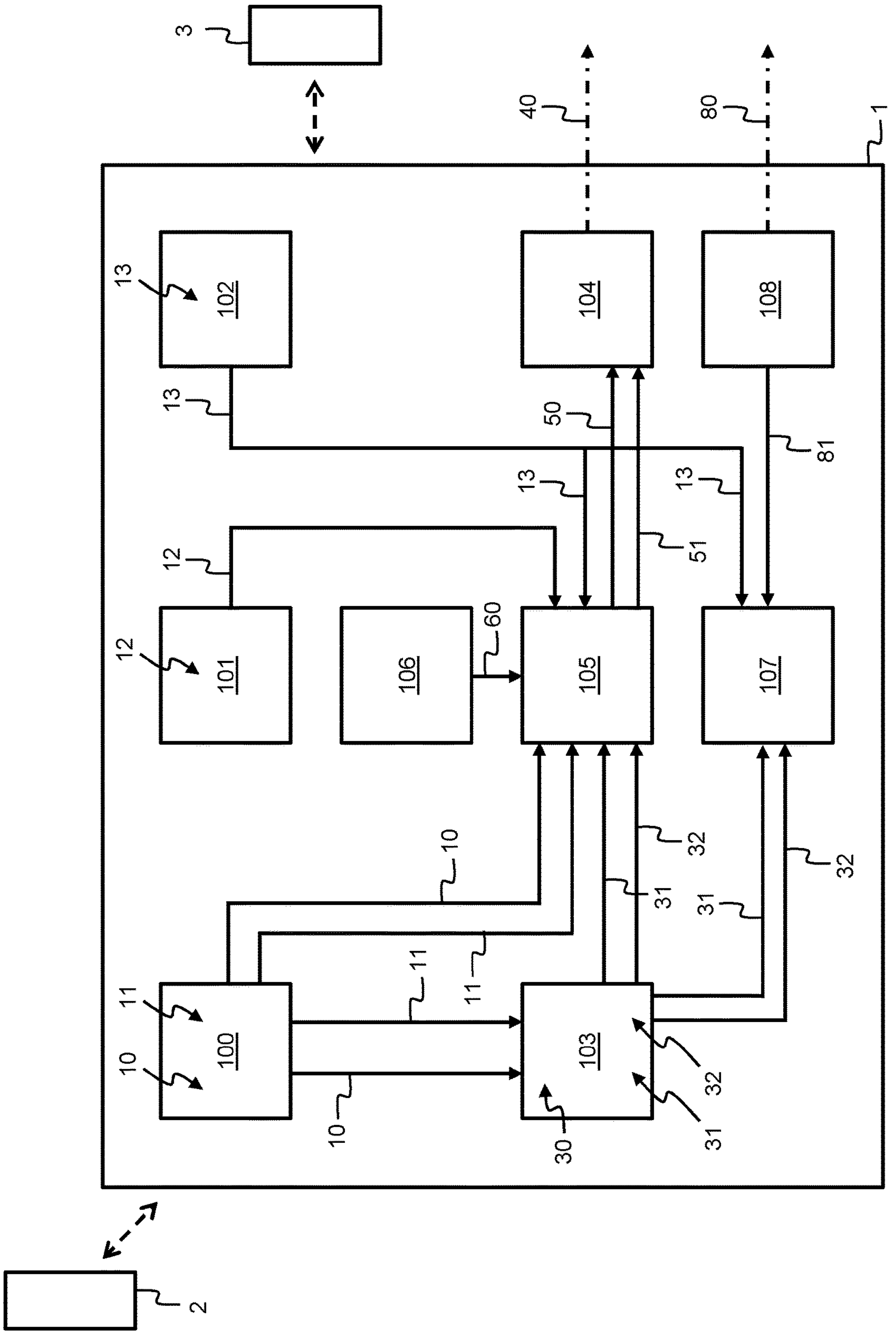
FIG. 1 depicts an example embodiment of an apparatus according to the present disclosure.

FIG. 1 schematically illustrates an example embodiment of an apparatus 1 according to the present disclosure. The apparatus 1 is used for enabling proximity awareness. The apparatus 1 comprises:

- a proximity assessing unit 100 comprising an Ultra-Wide Band interface, wherein the proximity assessing unit 100 is configured to determine a distance 10 between the apparatus 1 and a neighbouring device 2;3 and/or an orientation 11 of the apparatus 1 with respect to a neighbouring device 2;3;

a first determining unit 101 configured to determine one or more apparatus parameters 12 comprising at least one of:

a noise level in the vicinity of the apparatus;

an activity level of the apparatus;

an identifier of the apparatus;

a user group associated with the apparatus;

presence of one or more certificates on the apparatus;

a second determining unit 102 configured to determine one or more neighbouring device parameters 13 comprising at least one of:

an activity level of the neighbouring device;

an identifier of the neighbouring device;

a user group associated with the neighbouring device;

a type of the neighbouring device;

presence of one or more neighbouring certificates on the neighbouring device;

a stimulus generating unit 104 configured to generate a stimulus 40; and a selecting unit 105 configured to select a type 50 and/or an intensity 51 of the stimulus 40 in function of a combination of the distance 10 and/or the orientation 11, the one or more apparatus parameters 12 and the one or more neighbouring device parameters 13.

Optionally, the apparatus 1 further comprises a third determining unit 103 configured to: determine a duration 30 since a previous determination of a distance 10 and/or an orientation 11 between the apparatus 1 and the neighbouring device 2;3; and determine a change in distance 31 and/or in orientation 32 between the previous determination and the determination by the proximity assessing unit 100. The selecting unit 105 is further configured to adapt the type 50 and/or the intensity 51 of the stimulus 40 based on a combination of the change in distance 31 and/or in orientation 32, the one or more apparatus parameters 12 and the one or more neighbouring device parameters 13. The proximity assessing unit 100 is configured to determine the distance 10 between the apparatus 1 and the neighbouring devices 2;3 and/or the orientation 11 of the apparatus 1 with respect to the neighbouring devices 2;3 with a frequency based on a combination of the type 50 and/or the intensity 51 of the stimulus 40 in function of a combination of the distance 10 and/or the orientation 11, the one or more device parameters 12 and the one or more neighbouring device parameters 13. The type 50 of the stimulus 40 corresponds to one or more of the following: sound; light; vibration; signaling; activating a stimulus on another device. The intensity 51 of the stimulus 40 corresponds to one or more of the following: sound level; sound frequency; light intensity; wavelength; light source selection; vibration frequency; vibration amplitude; frequency of signaling; content of signaling. Optionally, the apparatus 1 further comprises a rule engine 106 configured to obtain one or more predetermined rules 60, wherein each of the predetermined rules 60 defines a correspondence between a type 50 and/or an intensity 51 of the stimulus 40 and a predetermined combination of the distance 10 and/or the orientation 11, the one or more apparatus parameters 12 and the one or more neighbouring device parameters 12. The selecting unit 105 is further configured to select the type 50 and/or the intensity 51 of the stimulus 40 in function of one or more of the predetermined rules 60. The predetermined rules 60 comprise predetermined thresholds for the apparatus parameters 12 and/or for the neighbouring device parameters 13. The proximity assessing unit 100 is configured to assess the distance 10 and/or the orientation 11 between the apparatus 1 and the neighbouring devices 2;3 from one or more of the following: a signal strength of a signal received by the apparatus 1; a timestamp of reception of the signal by the apparatus 1; phase information comprised in the signal 1. Optionally, the apparatus 1 further comprises a saving unit 107 configured to generate a neighbour table 70 and further configured to store the neighbouring device parameters 13 in the neighbour table 70. The apparatus 1 further comprises a discovery unit 108 configured to broadcast a discovery signal 80. The saving unit 107 is further configured to store in the neighbour table 70 at least one or more of the following: the duration 30 since a previous determination of a distance 10 between the apparatus 1 and the neighbouring devices 2;3 and/or orientation 11 of the apparatus 1 with respect to the neighbouring devices 2;3; the change in distance 31 and/or in orientation 32 determined between the previous determination and the determination by the proximity assessing unit 100; a broadcasting duration 81 since broadcasting a previous discovery signal 80. The apparatus further comprises a receiver configured to receive signals generated by the neighbouring devices 2;3. For example, the receiver of the apparatus is configured to receive signals emitted by the devices 2;3 as reply to the discovery signal 80 sent by the apparatus 1. Optionally, the apparatus further comprises a battery to ensure energetically independence to the apparatus 1 up to for example several days, with a recharging time of only a few hours. For example, the apparatus 1 is for example comprised in a for example compact casing of for example 9.5×4.8×1.8 cm weighing for example only tens of grams, for example 57 grams, which makes it very easy of use and lightweight.

Figure 2:
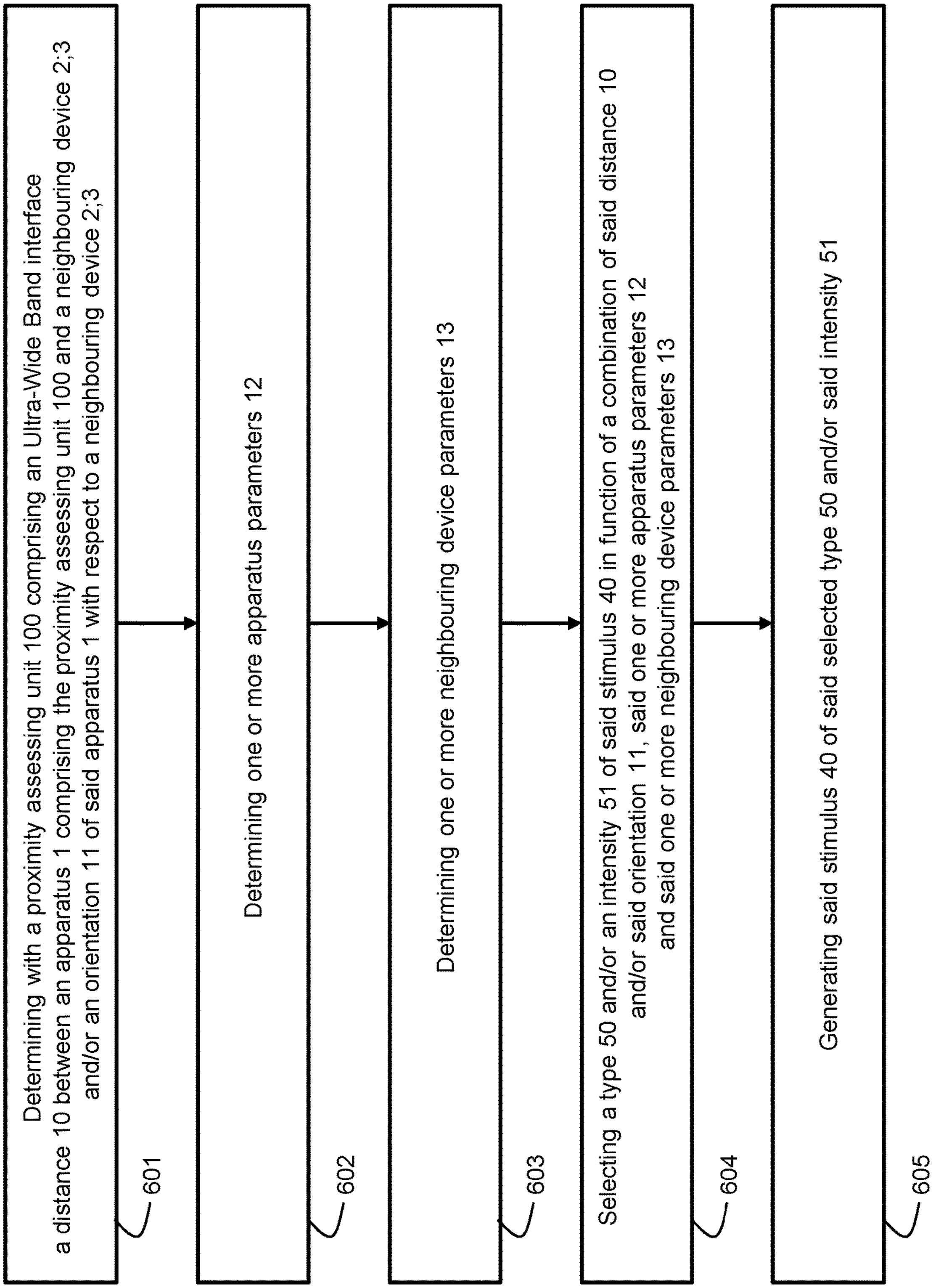
FIG. 2 depicts an example embodiment of a computer-implemented method according to the present disclosure.

FIG. 2 schematically illustrates an example embodiment of a computer-implemented method according to the present disclosure for enabling proximity awareness for an apparatus comprising a proximity assessing unit comprising an Ultra-Wide Band interface. In a first step 601, a distance 10 between the apparatus 1 and a neighbouring device 2;3 and/or an orientation 11 of the apparatus 1 with respect to a neighbouring device 2;3 is determined by the proximity assessing unit of the apparatus. In a second step 602 consequent to the first step 601, one or more apparatus parameters 12 are determined, wherein the apparatus parameters 12 comprise at least one of: a noise level in the vicinity of the apparatus; an activity level of the apparatus; an identifier of the apparatus; a user group associated with the apparatus; presence of one or more certificates on the apparatus. In a third step 603 consequent to the second step 602, one or more neighbouring device parameters 13 are determined, wherein the one or more neighbouring device parameters 13 comprise at least one of: an activity level of the neighbouring device; an identifier of the neighbouring device; a user group associated with the neighbouring device; a type of the neighbouring device; presence of one or more neighbouring certificates on the neighbouring device. In a fourth step 604 consequent to the third step 603, a type 50 and/or an intensity 51 of the stimulus 40 are selected in function of a combination of the distance 10 and/or the orientation 11, the one or more apparatus parameters 12 and the one or more neighbouring device parameters 13. In a final step 605 consequent to the fourth step 604, the stimulus 40 of the type 50 and/or of the intensity 51 is generated. Optionally, the apparatus 1 further comprises an accelerometer, not depicted on FIG. 2 for clarity reasons, wherein the accelerometer determines a rate of change in velocity of the apparatus and provides this rate of change in velocity of the apparatus to the first determining unit 101. This way, the first determining unit 101 determines an activity level of the apparatus.

Figure 3:
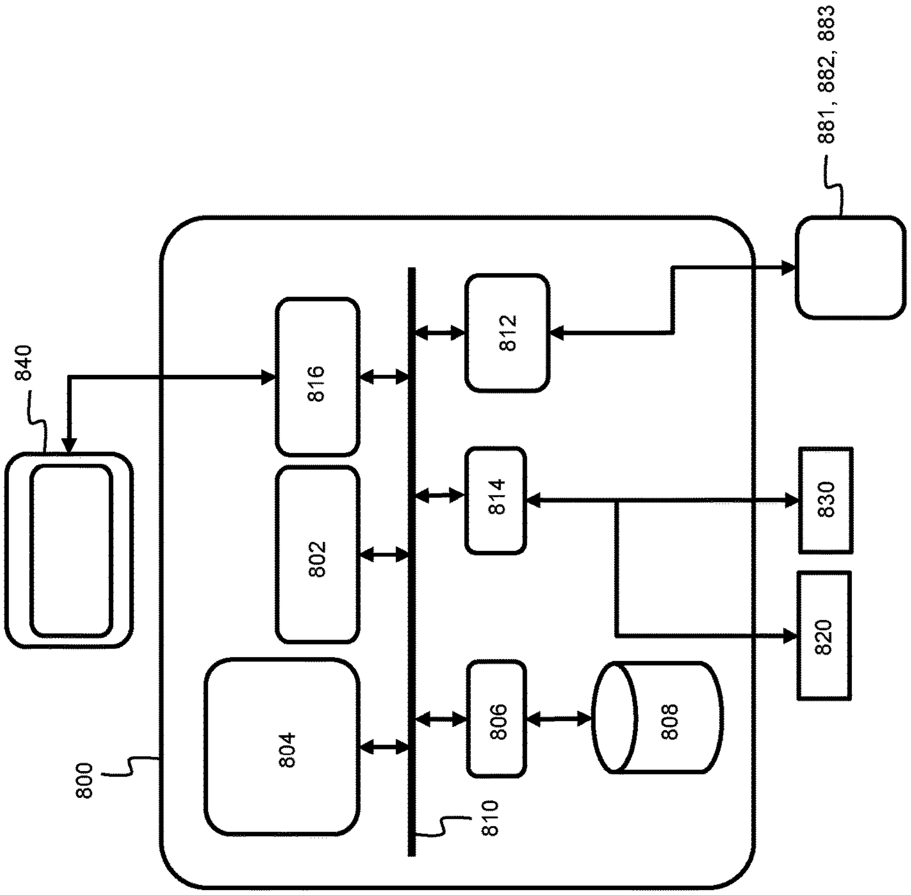
FIG. 3 shows an example embodiment of a suitable computing system for performing one or several steps in embodiments of the invention.

FIG. 3 shows a suitable computing system 800 enabling to implement embodiments of the system. Computing system 800 may in general be formed as a suitable general-purpose computer and comprise a bus 810, a processor 802, a local memory 804, one or more optional input interfaces 814, one or more optional output interfaces 816, a communication interface 812, a storage element interface 806, and one or more storage elements 808. Bus 810 may comprise one or more conductors that permit communication among the components of the computing system 800. Processor 802 may include any type of conventional processor or microprocessor that interprets and executes programming instructions. Local memory 804 may include a random-access memory (RAM) or another type of dynamic storage device that stores information and instructions for execution by processor 802 and/or a read only memory (ROM) or another type of static storage device that stores static information and instructions for use by processor 802. Input interface 814 may comprise one or more conventional mechanisms that permit an operator or user to input information to the computing device 800, such as a keyboard 820, a mouse 830, a pen, voice recognition and/or biometric mechanisms, a camera, etc. Output interface 816 may comprise one or more conventional mechanisms that output information to the operator or user, such as a display 840, etc. Communication interface 812 may comprise any transceiver-like mechanism such as for example one or more Ethernet interfaces that enables computing system 800 to communicate with other devices and/or systems, for example with other computing devices 881, 882, 883. The communication interface 812 of computing system 800 may be connected to such another computing system by means of a local area network (LAN) or a wide area network (WAN) such as for example the internet. Storage element interface 806 may comprise a storage interface such as for example a Serial Advanced Technology Attachment (SATA) interface or a Small Computer System Interface (SCSI) for connecting bus 810 to one or more storage elements 808, such as one or more local disks, for example SATA disk drives, and control the reading and writing of data to and/or from these storage elements 808. Although the storage element(s) 808 above is/are described as a local disk, in general any other suitable computer-readable media such as a removable magnetic disk, optical storage media such as a CD or DVD, -ROM disk, solid state drives, flash memory cards, . . . could be used. Computing system 800 could thus correspond to the apparatus 1 in the embodiment illustrated by FIG. 1.

As used in this application, the term "circuitry" may refer to one or more or all of the following:

(a) hardware-only circuit implementations such as implementations in only analog and/or digital circuitry and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and/or processor(s), such as microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular network device, or other computing or network device.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An apparatus for enabling proximity awareness, wherein said apparatus comprises:

a proximity assessing unit comprising an Ultra-Wide Band interface, wherein said proximity assessing unit is configured to determine a distance between said apparatus and a neighbouring device and/or an orientation of said apparatus with respect to a neighbouring device;

a first determining unit configured to determine one or more apparatus parameters comprising at least one of:

a noise level in the vicinity of said apparatus;

an activity level of said apparatus;

an identifier of said apparatus;

a user group associated with said apparatus;

presence of one or more certificates on said apparatus;

a second determining unit configured to determine one or more neighbouring device parameters comprising at least one of:

an activity level of said neighbouring device;

an identifier of said neighbouring device;

a user group associated with said neighbouring device;

a type of said neighbouring device;

presence of one or more neighbouring certificates on said neighbouring device;

a stimulus generating unit configured to generate a stimulus;

a selecting unit configured to select a type and/or an intensity of said stimulus in function of a combination of said distance and/or said orientation, said one or more apparatus parameters and said one or more neighbouring device parameters;

a third determining unit configured to:

determine a duration since a previous determination of a distance and/or an orientation between said apparatus and said neighbouring device; and determine a change in distance and/or in orientation between said previous determination and said determination by said proximity assessing unit; and wherein said selecting unit is further configured to adapt said type and/or said intensity of said stimulus based on a combination of said change in distance and/or in orientation, said one or more apparatus parameters and said one or more neighbouring device parameters; and a rule engine configured to obtain one or more predetermined rules, wherein each of said predetermined rules defines a correspondence between a type and/or an intensity of said stimulus and a predetermined combination of said distance and/or said orientation, said one or more apparatus parameters and said one or more neighbouring device parameters; and wherein said selecting unit is further configured to select said type and/or said intensity of said stimulus in function of one or more of said predetermined rules.

2. The apparatus according to claim 1, wherein said proximity assessing unit is configured to determine said distance between said apparatus and said neighbouring devices and/or said orientation of said apparatus with respect to said neighbouring devices with a frequency in function of a combination of said type and/or said intensity of said stimulus and/or in function of a combination of said distance and/or said orientation, said one or more device parameters and said one or more neighbouring device parameters.

3. The apparatus according to claim 1, wherein said type of said stimulus corresponds to one or more of the following:

sound;

light;

vibration;

signaling;

activating a stimulus on another device.

4. The apparatus according to claim 1, wherein said intensity of said stimulus corresponds to one or more of the following:

sound level;

sound frequency;

light intensity;

wavelength;

light source selection;

vibration frequency;

vibration amplitude;

frequency of signaling;

content of signaling.

5. The apparatus according to claim 1, wherein said predetermined rules comprise predetermined thresholds for said apparatus parameters and/or for said neighbouring device parameters.

6. The apparatus according to claim 1, wherein said proximity assessing unit is configured to assess said distance and/or said orientation between said apparatus and said neighbouring device from one or more of the following:

a signal strength of a signal received by said apparatus;

a timestamp of reception of said signal by said apparatus;

phase information comprised in said signal.

7. The apparatus according to claim 1, wherein said apparatus further comprises a saving unit configured to generate a neighbour table and further configured to store said neighbouring device parameters in said neighbour table.

8. The apparatus according to claim 1, wherein said apparatus further comprises a discovery unit configured to broadcast a discovery signal.

9. The apparatus according to claim 1, wherein said saving unit is further configured to store in said neighbour table at least one or more of the following:

said duration since a previous determination of a distance between said apparatus and said neighbouring devices and/or orientation of said apparatus with respect to said neighbouring devices;

said change in distance and/or in orientation determined between said previous determination and said determination by said proximity assessing unit;

a broadcasting duration since broadcasting a previous discovery signal.

10. The apparatus according to claim 1, wherein said apparatus further comprises an accelerometer configured to determine acceleration data for said apparatus; and wherein said first determining unit is further configured to determine said activity level of said apparatus from at least said acceleration data.

11. A computer-implemented method for enabling proximity awareness for an apparatus comprising a proximity assessing unit comprising an Ultra-Wide Band interface, wherein said method comprises the steps of:

determining with said proximity assessing unit a distance between said apparatus and a neighbouring device and/or an orientation of said apparatus with respect to a neighbouring device;

determining one or more apparatus parameters comprising at least one of:

a noise level in the vicinity of said apparatus;

an activity level of said apparatus;

an identifier of said apparatus;

a user group associated with said apparatus;

presence of one or more certificates on said apparatus;

determining one or more neighbouring device parameters comprising at least one of:

an activity level of said neighbouring device;

an identifier of said neighbouring device;

a user group associated with said neighbouring device;

a type of said neighbouring device;

presence of one or more neighbouring certificates on said neighbouring device;

selecting a type and/or an intensity of said stimulus in function of a combination of said distance and/or said orientation, said one or more apparatus parameters and said one or more neighbouring device parameters;

generating said stimulus of said selected type and/or said intensity;

determining a duration since a previous determination of a distance and/or an orientation between said apparatus and said neighbouring device;

determining a change in distance and/or in orientation between said previous determination and said determination by said proximity assessing unit;

adapting said type and/or said intensity of said stimulus based on a combination of said change in distance and/or in orientation, said one or more apparatus parameters and said one or more neighbouring device parameters;

obtaining one or more predetermined rules, wherein each of said predetermined rules defines a correspondence between a type and/or an intensity of said stimulus and a predetermined combination of said distance and/or said orientation, said one or more apparatus parameters and said one or more neighbouring device parameters; and selecting said type and/or said intensity of said stimulus in function of one or more of said predetermined rules.

12. A non-transitory computer readable storage medium comprising computer-executable instructions for performing the following steps when the program is run on a computer:

determining with a proximity assessing unit comprising an Ultra-Wide Band interface a distance between an apparatus comprising said proximity assessing unit and a neighbouring device and/or an orientation of said apparatus with respect to a neighbouring device;

determining one or more apparatus parameters comprising at least one of:

a noise level in the vicinity of said apparatus;

an activity level of said apparatus;

an identifier of said apparatus;

a user group associated with said apparatus;

presence of one or more certificates on said apparatus;

determining one or more neighbouring device parameters comprising at least one of:

an activity level of said neighbouring device;

an identifier of said neighbouring device;

a user group associated with said neighbouring device;

a type of said neighbouring device;

presence of one or more neighbouring certificates on said neighbouring device;

selecting a type and/or an intensity of said stimulus in function of a combination of said distance and/or said orientation, said one or more apparatus parameters and said one or more neighbouring device parameters;

generating said stimulus of said selected type and/or said intensity;

determining a duration since a previous determination of a distance and/or an orientation between said apparatus and said neighbouring device;

determining a change in distance and/or in orientation between said previous determination and said determination by said proximity assessing unit;

adapting said type and/or said intensity of said stimulus based on a combination of said change in distance and/or in orientation, said one or more apparatus parameters and said one or more neighbouring device parameters;

obtaining one or more predetermined rules, wherein each of said predetermined rules defines a correspondence between a type and/or an intensity of said stimulus and a predetermined combination of said distance and/or said orientation, said one or more apparatus parameters and said one or more neighbouring device parameters; and selecting said type and/or said intensity of said stimulus in function of one or more of said predetermined rules.

* * * * *